(12) United States Patent
Oka et al.

(10) Patent No.: US 6,531,546 B2
(45) Date of Patent: Mar. 11, 2003

(54) RUBBER COMPOSITION

(75) Inventors: Katsumi Oka, Tokyo (JP); Toshihiro Nishimura, Tokyo (JP); Fumio Tsutsumi, Tokyo (JP); Yutaka Abe, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/947,525

(22) Filed: Sep. 7, 2001

(65) Prior Publication Data

US 2002/0058759 A1 May 16, 2002

(30) Foreign Application Priority Data

Sep. 8, 2000 (JP) ......................................... 2000-272570

(51) Int. Cl.$^7$ ..................... C08L 23/00; C08L 23/04; C08L 23/16
(52) U.S. Cl. ..................... 525/191; 525/216; 525/232; 525/240
(58) Field of Search ............................. 525/191, 216, 525/232, 240

(56) References Cited

U.S. PATENT DOCUMENTS

| 3,884,993 A | | 5/1975 | Gros | |
|---|---|---|---|---|
| 5,677,382 A | * | 10/1997 | Tsuji et al. | ................. 525/193 |
| 5,710,218 A | * | 1/1998 | Nakahama et al. | ......... 524/302 |

FOREIGN PATENT DOCUMENTS

| EP | 0 344 380 | 12/1989 |
|---|---|---|
| EP | 0 466 380 | 9/1991 |
| EP | 0 832 926 | 4/1998 |

OTHER PUBLICATIONS

K.F. Heinisch, "EPDM Rubber", Dictionary Of Rubber, Applied Science Publishers, Ltd. pp. V, 192–193, 1974.
Martin E. Samuels, "Ethylene–Propylene Rubbers", The Vanderbilt Rubber Handbook, R.T. Vanderbilt Company Inc., pp. 147–169, 1978.

Jacqueline I. Kroschwitz, "Ethylene–Propylene Elastomers", Concise Encyclopedia Of Polymer Science And Engineering, John Wiley & Sons, pp. 359–362, 1990.

"Ethylene–Propylene Elastomers", Encyclopedia Of Polymer Science And Engineering, vol. 6, John Wiley & Sons, pp.522–524 & 562, 1986.

* cited by examiner

Primary Examiner—Nathan M. Nutter
(74) Attorney, Agent, or Firm—Oblon, Spivak, McClelland, Maier & Neustadt, P.C.

(57) ABSTRACT

A rubber composition comprising (a) a low molecular weight copolymer rubber which is an ethylene/α-olefin/non-conjugated diene copolymer rubber having a limiting viscosity [η] of 0.4–1.6 dl/g measured in decalin at 135° C., and an ethylene content of 40–60 wt % and (b) a high molecular weight copolymer rubber which is an ethylene/α-olefin/non-conjugated diene copolymer rubber having a Mooney viscosity ($ML_{1+4}$, 100° C.) of 60–150, an ethylene content of 60–80 wt %, and an iodine number of 5–35, wherein the difference between the iodine number of the low molecular weight copolymer rubber (a) and the iodine number of the high molecular weight copolymer rubber (b) is 5 or less and the ratio by weight of the low molecular weight copolymer rubber (a) and the high molecular weight copolymer rubber (b) is 50/50 to 80/20, the rubber composition having a Mooney viscosity ($ML_{1+4}$, 100° C.) of 20–50. The rubber composition exhibits superior roll processability and extrusion processability, excellent surface appearance and adhesiveness, can be processed easily, and produces vulcanized rubber exhibiting excellent mechanical characteristics and good low and high temperature properties.

22 Claims, No Drawings

RUBBER COMPOSITION

BACKGROUND OF THE INVENTION

1. Field of the Invention

The present invention relates to a rubber composition comprising an ethylene/α-olefin/non-conjugated diene copolymer rubber as a major component, exhibiting superior processability, such as roll processability and extrusion processability, excellent tackiness (adhesiveness), and capable of producing vulcanized rubber having excellent mechanical characteristics and low and high temperature properties.

The rubber composition of the present invention can be suitably used for a wide variety of applications such as a hose, sponge material, sealing material, electric insulating material, injection processing material, industrial rubber product, rubber material for vehicles, and the like.

2. Description of the Background Art

Conventionally, ethylene/α-olefin/non-conjugated diene copolymer rubbers have more excellent weather resistance, heat resistance, and ozone resistance than diene-type rubbers due to absence of unsaturated bonds in the main chain and, therefore, are used for a wide variety of applications such as a hose, sponge material, sealing material, injection processing material, rubber material for vehicles, and the like.

The extended area of applications of such products in recent years requires a rubber material exhibiting better properties and processability in both a high temperature region and a low temperature region.

Conventionally, when using an ethylene/α-olefin/non-conjugated diene copolymer rubber as a rubber material exhibiting superior processability, either a low molecular weight copolymer among the ethylene/α-olefin/non-conjugated diene copolymers is used or such a copolymer rubber is used in admixture with a larger amount of process oil.

However, an ethylene/α-olefin/non-conjugated diene copolymer rubber having a small molecular weight results in formed products with poor properties, particularly poor strength. Addition of a large amount of process oil to an ethylene/α-olefin/non-conjugated diene copolymer rubber not only may soil a mold due to bleed-out, but also may cause vulcanization-adhesion defects, resulting in formed products with inadequate properties.

An object of the present invention is to provide a rubber composition comprising an ethylene/α-olefin/non-conjugated diene copolymer rubber, exhibiting superior processability, such as roll processability and extrusion processability, producing formed products with an excellent surface, and exhibiting excellent adhesiveness.

Another object of the present invention is to provide an ethylene/α-olefin/non-conjugated diene copolymer rubber composition capable of producing vulcanized rubber having excellent mechanical characteristics and superior low and high temperature properties.

SUMMARY OF THE INVENTION

As a result of extended studies, the inventors of the present invention have found that the above object can be attained if a rubber composition comprises a specific low molecular weight ethylene/α-olefin/non-conjugated diene copolymer rubber and a specific high molecular weight ethylene/α-olefin/non-conjugated diene copolymer rubber in combination. The inventors have further found that processability of the copolymer rubber can be improved if such a rubber composition is combined with a specific ethylene/α-olefin/non-conjugated diene copolymer rubber. These findings have led to the completion of the present invention.

The above object can be achieved in the present invention by a rubber composition comprising (a) a low molecular weight copolymer rubber which is an ethylene/α-olefin/non-conjugated diene copolymer rubber having a limiting viscosity [η] of 0.4–1.6 dl/g measured in decalin at 135° C., an ethylene content of 40–60 wt %, and an iodine number of 5–35 and (b) a high molecular weight copolymer rubber which is an ethylene/α-olefin/non-conjugated diene copolymer rubber having a Mooney viscosity ($ML_{1+4}$, 100° C.) of 60–150, an ethylene content of 60–80 wt %, and an iodine number of 5–35, wherein the difference between the iodine number of the low molecular weight copolymer rubber (a) and the iodine number of the high molecular weight copolymer rubber (b) is 5 or less and the ratio by weight of the low molecular weight copolymer rubber (a) and the high molecular weight copolymer rubber (b) is 50/50 to 80/20, the rubber composition having a Mooney viscosity (ML1+4, 100° C.) of 20–50.

In the above rubber composition, the difference between the iodine number of the low molecular weight copolymer rubber (a) and the iodine number of the high molecular weight copolymer rubber (b) is preferably 3 or less.

In the above rubber composition, the α-olefin in the low molecular weight copolymer rubber (a) or the high molecular weight copolymer rubber (b) is preferably one or more α-olefins selected from the group consisting of propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene.

In the above rubber composition, the α-olefin in the low molecular weight copolymer rubber (a) or the high molecular weight copolymer rubber (b) is preferably propylene, 1-butene, or 1-octene.

In the above rubber composition, the non-conjugated diene in the low molecular weight copolymer rubber (a) or the high molecular weight copolymer rubber (b) is preferably one or more non-conjugated dienes selected from the group consisting of 5-ethylidene-2-norbornene, 5-propylidene-2-norbornene, dicyclopentadiene, 5-vinyl-2-norbornene, 5-methylene-2-norbornene, 5-isopropylidene-2-norbornene, norbornadiene, 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene, and 7-methyl-1,6-octadiene.

In the above rubber composition, the non-conjugated diene in the low molecular weight copolymer rubber (a) or the high molecular weight copolymer rubber (b) is preferably 1,4-hexadiene, dicyclopentadiene, or 5-ethylidene-2-norbornene.

The above object can be achieved in the present invention by a vulcanized rubber product obtained by vulcanizing the above rubber composition using sulfur, a sulfur compound, or an organic peroxide.

In the above vulcanized rubber product, the sulfur or sulfur compound is preferably used in an amount from 0.1 to 10 parts by weight for 100 parts by weight of the copolymer rubber.

The above object can be achieved in the present invention by a rubber composition comprising 30–80 wt % of the above rubber composition and 20–70 wt % of an ethylene/α-olefin/non-conjugated diene copolymer rubber (c) having a Mooney viscosity ($ML_{1+4}$, 100° C.) of 30–90, an ethylene content of 45–60 wt %, and an iodine number of 5–35, provided the total of the rubber composition and the ethylene/α-olefin/non-conjugated diene copolymer rubber (c) is 100 wt % (the ethylene/α-olefin/non-conjugated diene copolymer rubber (c) is hereinafter referred to simply as "copolymer rubber (c)").

Other objects, features and advantages of the invention will hereinafter become more readily apparent from the following description.

DETAILED DESCRIPTION OF THE INVENTION AND PREFERRED EMBODIMENTS

A preferred embodiment of the present invention will be described in more detail.

The present invention includes a first rubber composition comprising a low molecular weight copolymer rubber (a) and a high molecular weight copolymer rubber (b), and a second rubber composition comprising the first rubber composition and a copolymer rubber (c). In the following description, "a rubber composition" means both the first and second rubber compositions unless otherwise indicated.

First rubber composition

The low molecular weight copolymer rubber (a) is an ethylene/α-olefin/non-conjugated diene copolymer rubber having a limiting viscosity [η] of 0.4–1.6 dl/g, and preferably 0.5–1.2 dl/g, measured in decalin at 135° C., an ethylene content of 40–60 wt %, and preferably 45–55 wt %, and an iodine number of 5–35, and preferably 7–30.

If the limiting viscosity [η] is less than 0.4 dl/g, vulcanization is retarded and the strength of vulcanized products is impaired; if more than 1.6 dl/g, on the other hand, fluidity and adhesive properties are impaired. In both cases, the effect of using the low molecular weight copolymer rubber (a) is small. The ethylene/α-olefin/non-conjugated diene copolymer rubber having a limiting viscosity [η] of the above range has a Mooney viscosity ($ML_{1+4}$, 100° C.) of 19 or less.

If the ethylene content of the low molecular weight copolymer rubber (a) is less than 40 wt %, the resulting rubber composition does not possess adequate shape retention properties, making it difficult to maintain an extruded material shape. If the content exceeds 60 wt %, the resulting rubber composition exhibits only inadequate processability, producing sheets with a poor surface.

If the iodine number is less than 5, cross-linking is insufficient, resulting in vulcanized rubber with impaired compression set. If the iodine number is more than 40, the copolymer rubber tends to induce gelation during kneading and the gel may become a cause of granule production during a forming operation such as extrusion.

The high molecular weight copolymer rubber (b) is an ethylene/α-olefin/non-conjugated diene copolymer rubber having a Mooney viscosity ($ML_{1+4}$, 100° C.) of 60–150, preferably 70–130, an ethylene content of 60–80 wt %, preferably 65–78 wt %, and an iodine number of 5–35, preferably 7–30.

If the Mooney viscosity ($ML_{1+4}$, 100° C.) is less than 60, the first rubber composition has a low viscosity and exhibits decreased shape retention capability; if more than 150, on the other hand, extrusion properties and fluidity of the first rubber composition is decreased.

If the ethylene content is less than 60 wt %, the mechanical strength of the vulcanized product made from the first rubber composition decreases and the compression set is impaired; if more than 80 wt %, the vulcanized product has poor low temperature properties.

If the iodine number is less than 5, cross-linking is insufficient and compression set is impaired. If the iodine number is more than 40, the copolymer rubber tends to induce gelation during kneading and the gel may cause granule production during a forming operation such as extrusion.

The difference between the iodine number of the low molecular weight copolymer rubber (a) and the iodine number of the high molecular weight copolymer rubber (b) is 5 or less, and preferably 3 or less. If the iodine number of the two copolymer rubbers, i.e. the amount of the non-conjugated diene components, is the same or close, the cross-linking reaction proceeds uniformly, resulting in vulcanized rubber with excellent low temperature properties and high temperature properties.

If a low molecular weight copolymer rubber (a) having a comparatively small molecular weight and a small ethylene content and a high molecular weight copolymer rubber (b) having a comparatively large molecular weight and a high ethylene content are used in combination and the difference between the iodine numbers of the two copolymer rubbers is small, a first rubber composition with excellent processability such as roll processability and extrusion processability can be obtained without using a large amount of process oil. The rubber containing such copolymer rubbers exhibits excellent adhesion and produces a vulcanized rubber with superior characteristics in both a high temperature region and low temperature region.

The ratio by weight of the low molecular weight copolymer rubber (a) and the high molecular weight copolymer rubber (b) in the first rubber composition is 50/50 to 80/20, and preferably 55/45 to 80/20.

The Mooney viscosity ($ML_{1+4}$, 100° C.) of the first rubber composition containing the low molecular weight copolymer rubber (a) and the high molecular weight copolymer rubber (b) at the above ratio by weight is 20–50, and preferably 20–40.

If the ratio by weight of the low molecular weight copolymer rubber (a) and the high molecular weight copolymer rubber (b) is in the above range and the Mooney viscosity ($ML_{1+4}$, 100° C.) is in the above range, the first rubber composition exhibits excellent roll processability and extrusion processability, as well as superior fluidity and shape retention characteristics, and produces a vulcanized rubber with superior strength, elongation, high temperature properties, and low temperature properties.

As α-olefins which form the low molecular weight rubber composition (a) and the high molecular weight rubber composition (b), α-olefins having 3–20 carbon atoms, such as propylene, 1-butene, 1-pentene, 1-hexene, 4-methyl-1-pentene, 1-heptene, 1-octene, 1-decene, 1-dodecene, 1-tetradecene, 1-hexadecene, 1-eicosene, and the like can be given. These α-olefins may be used either individually or in combination of two or more. Of these, propylene, 1-butene, and 1-octene are preferable, with propylene being particularly preferable.

Given as examples of non-conjugated dienes are cyclic non-conjugated dienes such as 5-ethylidene-2-norbornene, 5-propylidene-2-norbornene, dicyclopentadiene, 5-vinyl-2-norbornene, 5-methylene-2-norbornene, 5-isopropylidene-2-norbornene, and norbornadiene; and linear non-conjugated dienes such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene, and 7-methyl-1,6-octadiene. These non-conjugated dienes may be used either individually or in combination of two or more. Of the above non-conjugated dienes, 1,4-hexadiene, dicyclopentadiene, and 5-ethylidene-2-norbornene are preferable, with 5-ethylidene-2-norbornene being particularly preferable.

Second rubber composition

The second rubber composition of the present invention comprises a combination of the first rubber composition and a specific copolymer rubber (c).

The second rubber composition contains the first rubber composition in the amount of 30–80 wt %, and preferably 40–70 wt %, and copolymer rubber (c) in the amount of 20–70 wt %, and preferably 30–60 wt %. Here the total of the two components is 100 wt %.

The secondary rubber composition exhibits better processability, such as roll processability and extrusion processability, than the copolymer rubber (c) alone.

If the proportion of the first rubber composition is less than 30 wt %, the improvement in processability is small. If the proportion of the first rubber composition is more than 80 wt %, the resulting composition is substantially the same as the first rubber composition, and shows no improvement over the copolymer rubber (c).

It is desirable that the copolymer rubber (c) have a Mooney viscosity (ML $_{1+4}$, 100° C.) of 30–90, and preferably from 35–70. The ethylene content of the copolymer rubber (c) is 45–60 wt %, and preferably 45–55 wt %. The iodine number of the copolymer rubber (c) is 5–35, and preferably 7–30. The types of ethylene/α-olefin/non-conjugated dienes used in the copolymer rubber (c) are the same as previously given for the low molecular weight copolymer rubber (a) and the higher molecular weight copolymer rubber (b). Preferable examples given for the copolymer rubbers (a) and (b) also apply to the copolymer rubber (c).

Such a copolymer rubber (c) may be a commonly used EPDM rubber.

The description hereinafter applies to both the first and second copolymer rubber compositions.

A suitable amount of various additives such as a vulcanizing agent, vulcanizing accelerator, vulcanizing assisting agent, softener, filler, foaming agent, and the like are added to the rubber compositions of the present invention according to the applications. The rubber compositions are then vulcanized to obtain vulcanized rubbers.

In this instance, the low molecular weight copolymer rubber (a) and the high molecular weight copolymer rubber (b), or the low molecular weight copolymer rubber (a), the high molecular weight copolymer rubber (b), and the copolymer rubber (c) may be blended before formulating the additives, or it is possible to blend these copolymer rubbers after the addition of the additives. The rubber composition may be obtained by a two step polymerization or may be obtained by blending polymer solutions, each containing one of the copolymer rubbers.

Sulfur, sulfur compounds, and organic peroxides can be given as examples of the vulcanizing agent.

As specific examples of sulfur, powdered sulfur, precipitated sulfur, colloidal sulfur, surface-treated sulfur, insoluble sulfur, and the like can be given. As specific examples of sulfur compounds, sulfur chloride, sulfur dichloride, macromolecular polysulfide, and the like can be given. Sulfur compounds releasing active sulfur at the vulcanizing temperature such as morpholine disulfide, alkylphenol disulfide, tetramethyl thiuram disulfide, dipentamethylene thiuram tetrasulfide, and selenium dimethyldithiocarbamate can also be given.

The sulfur or sulfur compounds are added in an amount from 0.1 to 10 parts by weight, and preferably from 0.5 to 5 parts by weight, for 100 parts by weight of the copolymer rubber composition.

When sulfur or a sulfur compound is used as a vulcanizing agent, a vulcanizing accelerator is preferably used in combination. Given as specific examples of vulcanizing accelerators are: sulfenamide compounds such as N-cyclohexyl-2-benzothiazolyl sulfenamide, N-oxydiethylene-2-benzothiazolyl sulfenamide, N,N-diisopropyl-2-benzothiazolyl sulfenamide; thiazole compounds such as 2-mercaptobenzothiazole, 2-(2'4'-dinitrophenyl) mercaptobenzothiazole, 2-(4'-morpholinodithio) benzothiazole, and dibenzothiazyl disulfide; guanidine compounds such as diphenyl guanidine, di-o-tolyl guanidine, di-o-nitrile guanidine, o-nitrile biguanide, and diphenyl guanidine phthalate; aldehyde-amine or aldehyde-ammonia compounds such as an acetaldehyde-aniline reactant, butylaldehyde-aniline condensate, hexamethylenetetramine, and acetaldehyde ammonia; imidazoline compounds such as 2-mercapto imidazoline; thiourea compounds such as thiocarbanilide, diethyl thiourea, dibutyl thiourea, trimethyl thiourea, and di-o-tolyl thiourea; thiuram compounds such as tetramethylthiuram monosulfide, tetramethylthiuram disulfide, tetraethylthiuram disulfide, tetrabutylthiuram disulfide, and pentamethylenethiuram tetrasulfide; salts of dithio acid such as zinc dimethyldithiocarbamate, zinc diethyldithiocarbamate, zinc di-n-butyldithiocarbamate, zinc ethylphenyldithiocarbamate, zinc butylphenyldithiocarbamate, zinc butylphenyldithiocarbamate, sodium dimethyldithiocarbamate, selenium dimethyldithiocarbamate, and tellurium dimethyldithiocarbamate; xantate compounds such as zinc dibutyl xanthogenate; and zinc oxide.

These vulcanizing accelerators are added in an amount from 0.1 to 20 parts by weight, and preferably from 0.2 to 10 parts by weight, for 100 parts by weight of the rubber composition.

Any organic peroxides conventionally used as peroxide vulcanization of rubbers may be used. Examples include dicumylperoxide, di-t-butylperoxide, di-t-butylperoxy-3,3,5-trimethylcyclohexane, t-butylhydroperoxide, t-butylcumylperoxide, benzoylperoxide, 2,5-dimethyl-2,5-di(t-butylperoxy)hexin-3,2,5-dimethyl-2,5-di(benzoylperoxy)hexane, 2,5-dimethyl-2,5-mono(t-butylperoxy)hexane, α,α'-bis(t-butylperoxy-m-isopropyl) benzene, and the like. Of these, dicumylperoxide, di-t-butylperoxide, and di-t-butylperoxy-3,3,5-trimethylcyclohexane are particularly preferred. These organic peroxides can be used either individually or in combination of two or more.

The amount of the organic peroxides used is appropriately determined according to the properties required for the rubber composition in the range of 0.0003–0.05 mol, and preferably 0.001–0.03 mol, for 100 g of the rubber composition.

When an organic peroxide is used as a vulcanizing agent, a vulcanizing assisting agent is preferably used in combination. Specific examples of vulcanizing assisting agents include sulfur; quinone dioxime compounds such as p-quinone dioxime, methacrylate compounds such as polyethylene glycol dimethacrylate, allyl compounds such as diallyl phthalate and triallyl cyanulate, maleimide compounds, divinylbenzene, and the like.

These vulcanizing assisting agents are added in an amount from 0.5 to 2 mol, preferably one mol, for one mol of the organic peroxides used.

As examples of softeners, process oil, lubricating oil, paraffin, liquid paraffin, petroleum asphalt, petroleum jelly, coal tar pitch, castor oil, linseed oil, rubber-substitute, bees wax, recinoleic acid, palmitic acid, barium stearate, calcium stearate, zinc laurate, atactic polypropylene, coumarone-indene resin, and the like can be given. A softener may be used as an extensible oil, in which case the rubber composition is extended in advance by the softener.

Carbon black, silicic acid powder, glass powder, glass beads, mica, calcium carbonate, potassium titanate whisker, talc, clay, barium sulfate, glass flake, fluororesin, and the like can be given as examples of the fillers added to the rubber composition of the present invention.

Of these, carbon black is preferably used from the viewpoint of increasing strength of the vulcanized rubber and cost reduction. Carbon black includes various types such as SRF, GPF, FEF, HAF, ISAF, SAF, FT, and MT, all of which can be used, with SRF, FEF, and GPF being particularly preferable types.

A foaming agent is added when a foam product is manufactured from the rubber composition of the present invention. As examples of foaming agents, sodium bicarbonate, sodium carbonate, ammonium bicarbonate, ammonium carbonate, ammonium nitrite, N,N'-dimethyl-N,N'-dinitrosoterephthalamide, N,N'-dinitrosopentamethylenetetramine, azodicarbonamide, azobisiso-butylonitrile, azocyclohexylnitrile, azodiaminobenzene, barium azodicarboxylate, benzenesulfonylhydrazide, toluenesulfonylhydrazide, P,P'-oxybis(benzenesulfonylhydrazide), diphenylsulfone-3,3'-disulfonylhydrazide, calcium azido, 4,4'-diphenyldisulfonylazido-p-toluenesulfonylazido, and the like can be given.

These foaming agents are added in an amount from 0.5 to 30 parts by weight, and preferably from 1 to 15 parts by weight, for 100 parts by weight of the rubber composition.

In addition, a foaming assisting agent may be used together with a foaming agent, as required.

In the manufacture of the vulcanized rubber products, other types of rubber or other types of ethylene/α-olefin/non-conjugated diene copolymer rubbers may be added to the rubber composition of the present invention as rubber components, to the extent not impairing the effect of the present invention.

A formulated rubber product can be prepared by kneading the above rubber composition and additives using a conventionally known kneader. Specifically, these components are kneaded using an open roll mill, Banbury mixer, and a kneading machine to obtain a formulated rubber product.

The formulated rubber product is then formed into a desired shape using an extruder or a mold, and vulcanized using a heating apparatus such as a high-frequency heating apparatus, air oven, PCM, LCM, or the like to obtain vulcanized rubber products.

The vulcanized rubber products can also be manufactured by forming and vulcanizing the formulated rubber composition in a mold using a known vulcanization apparatus.

Furthermore, the vulcanized rubber products can be manufactured by forming and vulcanizing the formulated rubber composition using an injection forming apparatus.

EXAMPLES

The present invention will be described in more detail by way of examples. However, these examples should not be construed as limiting the present invention.

Measurement and evaluation of each composition in the examples and comparative examples were carried out as follows.
(1) Ethylene content (wt %)
Measured by the IR absorption method.
(2) Iodine number
Measured by the IR absorption method.
(3) Mooney viscosity ($ML_{1+4}$, 100° C.)
The sample was previously heated for one minute at 100° C., followed by measurement of the Mooney viscosity for 4 minutes.
(4) Extrusion processability (Garvey die extrusion test)
The extrusion processability was evaluated according to ASTM-D2230A using formulated rubber compositions containing the low molecular weight copolymer rubber component (a) and high molecular weight copolymer rubber component (b) shown in Table 1.
(5) Roll processability and surface appearance
The roll processability was evaluated by winding the formulated rubber compositions containing the low molecular weight copolymer rubber component (a) and high molecular weight copolymer rubber component (b) shown in Table 1 around a roller at a front and rear roller temperature of 50° C. The processability was rated and classified into three classes. After five minutes, the sheet was cut and the surface was inspected by the naked eye to evaluate the conditions according to the following standard.
Roll processability evaluation
3: The compound is wound around the roller and smoothly rotated on the roller.
2: Part of the compound sometimes separates from roller.
1: Separation of the compound from the roller continues.
Evaluation of Surface
○: The surface is smooth and glossy.
Δ: The surface is smooth, but not glossy.
X: The surface is neither smooth nor glossy.
(6) Tackiness
Sheets with a thickness of 2 mm were prepared from the formulated rubber compositions containing the low molecular weight copolymer rubber component (a) and high molecular weight copolymer rubber component (b) shown in Table 1. Tackiness of the sheets was measured using PJCMA Tack Tester (manufactured by Toyo Seiki Kogyo Co., Ltd.) under the conditions of a temperature of 25° C., a load of 500 g, pressing time of 40 seconds, and a peeling speed of 20 mm/minute.
(7) Tensile test
100% modulus (M100), tensile strength at break ($T_B$), and elongation at break ($E_B$) were measured in accordance with JIS K6301.
(8) High temperature tensile test
Tensile strength at break ($T_B$) and elongation at break ($E_B$) were measured at 120° C. according to the same methods as applied to the tensile test.
(9) Gehman torsional stiffness test
$T_{10}$ was measured according to ASTM D1053.

Examples 1–4 and Comparative Examples 1–8

Compounds (formulated rubber compositions) for Examples 1–4 and Comparative Examples 1–8 were prepared using the following additives (2)–(5) in the amount indicated for 100 parts by weight of the low molecular weight copolymer rubber component (a) and high molecular weight copolymer rubber component (b) shown in Table 1 by kneading the mixture in a BR-type Banbury mixer (1.7 l) at 60 rpm for four minutes. Roll processability and sheet surface appearance were evaluated using these compounds.

In addition, these compounds were also used as samples for the evaluation of tackiness. After this, a Garvey die (conforming to ASTM-D2330A) was applied to a 50 mm extruder. The compounds were extruded at a cylinder temperature of 60° C. and a die temperature of 80° C. to evaluate the extrusion processability.

Compounds for vulcanization were obtained by kneading the above compounds and the following components (6)–(8) for five minutes in a 10-inch roll maintained at 50° C. Sheets prepared from the resulting compounds were vulcanized by steam pressing at 160° C. for 30 minutes. The vulcanized rubbers thus obtained were evaluated. The evaluation results are shown in Table 1.

The additives used are as follows.

(1) Rubber components: 100 parts by weight
(2) HAF carbon N330: 70 parts by weight
(3) Diana process oil PW-90 (manufactured by Idemitsu Kosan Co.,Ltd.): 20 parts by weight
(4) #1 Zinc oxide (manufactured by Nippon Chemical Industrial Co., Ltd.): 5 parts by weight
(5) Stearic acid (manufactured by Nippon Oil and Fats Co., Ltd.): 1 part by weight
(6) Tetramethylthiuram monosulfide: 1.5 parts by weight
(7) 2-Mercaptobenzothiazole: 0.5 part by weight
(8) Sulfur: 1.5 parts by weight The formulated rubber of Comparative Example 2 made from a low molecular weight copolymer rubber (a) having a limiting viscosity exceeding 1.6 dl/g, exhibited poor roll processability, surface appearance, extrusion processability, and tackiness.

The formulated rubber of Comparative Example 3 made from a low molecular weight copolymer rubber (a) having a limiting viscosity less than 0.4 dl/g produced a vulcanized rubber exhibiting poor strength, elongation, and high temperature properties.

The formulated rubber of Comparative Example 4 made from a low molecular weight copolymer rubber (a) having an ethylene content of less than 40 wt % produced a vulcanized rubber exhibiting poor strength, elongation, and high temperature properties.

The formulated rubber of Comparative Example 5 made from a high molecular weight copolymer rubber (b) having a Moony viscosity exceeding 150 exhibited poor roll processability, surface appearance, extrusion processability, and tackiness.

The formulated rubber of Comparative Example 6 was made from a high molecular weight copolymer rubber (b) having an ethylene content of more than 80 wt %. The

TABLE 1

| | Examples | | | | Comparative Examples | | | | | | | |
|---|---|---|---|---|---|---|---|---|---|---|---|---|
| | 1 | 2 | 3 | 4 | 1 | 2 | 3 | 4 | 5 | 6 | 7 | 8 |
| Low molecular weight copolymer rubber (a) | | | | | | | | | | | | |
| Limiting viscosity (dl/g) | 0.6 | 0.8 | 1.4 | 1.5 | 0.6 | 1.9 | 0.2 | 0.5 | 1.5 | 1.5 | 0.8 | 0.8 |
| Ethylene content (wt %) | 42 | 50 | 47 | 56 | 42 | 56 | 44 | 36 | 56 | 56 | 50 | 50 |
| Iodine number | 28 | 15 | 15 | 10 | 18 | 8 | 16 | 17 | 10 | 10 | 15 | 15 |
| High molecular weight copolymer rubber (b) | | | | | | | | | | | | |
| Mooney viscosity | 113 | 98 | 104 | 69 | 140 | 116 | 98 | 98 | 162 | 141 | 98 | 70 |
| Ethylene content (wt %) | 64 | 69 | 72 | 76 | 60 | 80 | 69 | 69 | 76 | 82 | 69 | 68 |
| Iodine number | 25 | 13 | 12 | 7 | 15 | 3 | 13 | 13 | 7 | 6 | 13 | 7 |
| Rubber composition | | | | | | | | | | | | |
| Ratio of copolymer rubbers (a)/(b) | 50/50 | 60/40 | 75/25 | 60/40 | 50/50 | 50/50 | 50/50 | 50/50 | 60/40 | 60/40 | 30/70 | 50/50 |
| Mooney viscosity | 48 | 27 | 37 | 32 | 57 | 50 | 28 | 29 | 48 | 46 | 49 | 30 |
| Properties of formulated rubber composition | | | | | | | | | | | | |
| Roll processability | 2 | 3 | 3 | 3 | 1 | 2 | 3 | 3 | 1 | 1 | 1 | 3 |
| Surface appearance | O | O | O | O | A | A | A | A | X | X | X | O |
| Extrusion processability | 15 | 16 | 16 | 15 | 12 | 11 | 14 | 14 | 9 | 10 | 12 | 15 |
| Tackiness (g) | 490 | 541 | 531 | 430 | 235 | 186 | 433 | 490 | 181 | 183 | 230 | 390 |
| Properties of vulcanized rubber | | | | | | | | | | | | |
| M100 (MPa) | 5.4 | 5.1 | 5.3 | 5.8 | 5.8 | 5.2 | 4.4 | 4.6 | 5.9 | 5.8 | 5.6 | 5.5 |
| $T_B$ (MPa) | 19.5 | 18.6 | 19.5 | 19.2 | 18.8 | 19.2 | 17.2 | 17.3 | 19.3 | 19.4 | 19.8 | 18.1 |
| $E_B$ (%) | 280 | 290 | 290 | 300 | 220 | 270 | 270 | 230 | 290 | 290 | 260 | 270 |
| 120° C. $T_B$ (MPa) | 7.7 | 7.8 | 7.9 | 7.9 | 7.0 | 7.4 | 6.9 | 7.0 | 7.9 | 7.8 | 7.9 | 7.3 |
| 120° C. $E_B$ (%) | 290 | 295 | 290 | 295 | 180 | 290 | 290 | 180 | 290 | 290 | 280 | 230 |
| Gehman torsional stiffness test: $T_{10}$ (° C.) | −49 | −49 | −50 | −48 | −48 | −46 | −47 | −49 | −46 | −44 | −46 | −46 |

The following findings can be derived from the results shown in Table 1.

The ethylene/α-olefin/non-conjugated diene copolymer rubber compositions of the present invention exhibited superior roll processability and extrusion processability, produced formulated rubber compositions with excellent surface appearance and adhesiveness, and produced vulcanized rubbers with excellent mechanical characteristics and good low and high temperature properties.

The formulated rubber of Comparative Example 1 made from rubber composition having a Moony viscosity exceeding 50 exhibited poor roll processability, surface appearance, extrusion processability, and tackiness (adhesiveness).

formulated rubber of Comparative Example 7 contains the high molecular weight copolymer rubber (b) in an excess amount. Both rubbers exhibited poor roll processability, surface appearance, extrusion processability, and tackiness, and produced vulcanized rubbers with impaired low temperature properties.

The formulated rubber of Comparative Example 8 was made from a low molecular weight copolymer rubber (a) and a high molecular weight copolymer rubber (b), of which the iodine numbers differ more than 5. This rubber produced a vulcanized product exhibiting poor strength, elongation, and high and low temperature properties.

Examples 5–6 and Comparative Example 9–10

Compounds (formulated rubbers) were prepared in the same manner as in Examples 1–4 from the rubber composition of Example 2 and the copolymer rubbers (c), of which the properties are shown in Table 2, in the proportion shown in Table 2. Processability of the compounds was evaluated. Here, the same copolymer rubbers (c) used in Examples 5 and 6 were respectively used in Comparative Examples 9 and 10. The additives (2)–(5) previously shown in the description for Examples 1–4 were added in the proportion indicated per 100 parts by weight of the total of the low molecular weight copolymer rubber component (a), the high molecular weight copolymer rubber component (b), and the copolymer rubber (c).

The results are shown in Table 2.

TABLE 2

|  | Examples | | Comparative Examples | |
|---|---|---|---|---|
|  | 5 | 6 | 9 | 10 |
| Rubber composition of Example 2 (wt %) | 40 | 80 | 0 | 0 |
| Copolymer rubber (c) (wt %) | 60 | 20 | 100 | 100 |
| Properties of copolymer rubber (c) | | | | |
| Mooney viscosity | 35 | 70 | 35 | 70 |
| Ethylene content (wt %) | 58 | 46 | 58 | 46 |
| Iodine number | 8 | 30 | 8 | 30 |
| Properties of formulated rubber composition | | | | |
| Roll processability | 3 | 3 | 2 | 1 |
| Surface appearance | O | O | Δ | X |
| Extrusion processability | 16 | 16 | 13 | 11 |

As can be seen from the results shown in Table 2, the second rubber composition comprising the first rubber composition of the present invention and the copolymer rubber (c) exhibited better processability than the copolymer rubber (c).

A formulated rubber in which the first rubber composition is used exhibits superior roll processability and extrusion processability, excellent surface appearance and adhesiveness, and can be processed easily. The vulcanized rubber produced from such a formulated rubber exhibits excellent mechanical characteristics and good low and high temperature properties.

Therefore, the first rubber composition of the present invention can be suitably used for a wide variety of applications such as a hose, corner sponge material, sealing material, injection processing material, electric wire coating material, industrial rubber product, rubber material for vehicles, and the like.

The formulated rubber made from the second rubber composition of the present invention also exhibits superior roll processability and extrusion processability, excellent surface appearance and adhesiveness, and can be processed easily. This indicates that the first rubber composition can improve processability of an ethylene/α-olefin/non-conjugated diene copolymer rubber.

Obviously, numerous modifications and variations of the present invention are possible in light of the above teachings. It is therefore to be understood that, within the scope of the appended claims, the invention may be practiced otherwise than as specifically described herein.

What is claimed is:

1. A rubber composition comprising (a) a copolymer rubber which is an ethylene/α-olefin/non-conjugated diene copolymer rubber having a limiting viscosity [η] of 0.4–1.6 dl/g measured in decalin at 135° C., and an ethylene content of 40–60 wt % and (b) a copolymer rubber which is an ethylene/α-olefin/non-conjugated diene copolymer rubber having a Mooney viscosity ($ML_{1+4}$, 100° C.) of 60–150, an ethylene content of 60–80 wt%, and an iodine number of 5–35, wherein the difference between the iodine number of the copolymer rubber (a) and the iodine number of the copolymer rubber (b) is 5 or less and the ratio by weight of the copolymer rubber (a) and the copolymer rubber (b) is 50/50 to 80/20, the rubber composition having a Mooney viscosity ($ML_{1+4}$, 100° C.) of 20–50.

2. The rubber composition according to claim 1, wherein the difference between the iodine number of the copolymer rubber (a) and the iodine number of the copolymer rubber (b) is 3 or less.

3. The rubber composition according to claim 1, wherein the α-olefin in the copolymer rubber (a) or the copolymer rubber (b) is one or more α-olefins selected from the group consisting of propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene.

4. The rubber composition according to claim 1, wherein the α-olefin in the copolymer rubber (a) or the copolymer rubber (b) is propylene, 1-butene, or 1-octene.

5. The rubber composition according to claim 1, wherein the non-conjugated diene in the copolymer rubber (a) or the copolymer rubber (b) is one or more non-conjugated dienes selected from the group consisting of 5-ethylidene-2-norbornene, 5-propylidene-2-norbornene, dicyclopentadiene, 5-vinyl-2-norbornene, 5-methylene-2-norbornene, 5-isopropylidene-2-norbornene, norbornadiene, 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene, and 7-methyl-1,6-octadiene.

6. The rubber composition according to claim 1, wherein the non-conjugated diene in the copolymer rubber (a) or the copolymer rubber (b) is 1,4-hexadiene, dicyclopentadiene, or 5-ethylidene-2-norbornene.

7. A vulcanized rubber product obtained by vulcanizing the rubber composition of claim 1 using sulfur, a sulfur compound, or an organic peroxide.

8. A vulcanized rubber product according to claim 7, wherein sulfur or a sulfur compound is used in an amount from 0.1 to 10 parts by weight for 100 parts by weight of the copolymer rubber.

9. A rubber composition comprising 30–80 wt % of the rubber composition of claim 1 and 20–70 wt % of an ethylene/α-olefin/non-conjugated diene copolymer rubber (c) having a Mooney viscosity ($ML_{1+4}$, 100° C.) of 30–90, an ethylene content of 45–60 wt %, and an iodine number of 5–35, provided the total of the rubber composition and the ethylene/α-olefin/non-conjugated diene copolymer rubber (c) is 100 wt %.

10. The rubber composition according to claim 9, wherein the ethylene/α-olefin/non-conjugated diene copolymer rubber (c) is a EPDM rubber.

11. The rubber composition according to claim 7, further comprising one or more vulcanizing accelerators when sulfur is used as a vulcanizing agent.

12. The rubber composition according to claim 11, wherein said vulcanizing accelerator is selected from the group consisting of a sulfenamide compound, a thiazole compound, a guanidine compound, an aldehyde-amine compound, an aldehyde-ammonia compound, an imidazoline compound, a thiourea compound, a thiuram compound, a salt of a dithio acid, a xantate compound, and zinc oxide.

13. The rubber composition according to claim 12, wherein said vulcanizing accelerator is in an amount ranging from 0.1 to 20 parts by weight per 100 parts by weight of the rubber composition.

14. The rubber composition according to claim 7, wherein said organic peroxide is one or more organic peroxides selected from the group consisting of dicumylperoxide, di-t-butylperoxide, di-t-butylperoxy-3,3,5-trimethylcyclohexane, t-butylhydroperoxide, t-butylcumyperoxide, benzoylperoxide, 2,5-dimethyl-2,5-di(t-butylperoxy) hexin-3,2,5-dimethyl-2,5-di(benzoylperoxy)hexane, 2,5-dimethyl-2,5-mono(t-butylperoxy)hexane, and α,α'-bix(t-butylperoxy-m-isopropyl)benzene.

15. The rubber composition according to claim 7, wherein organic peroxide is in an amount ranging from 0.0003 to 0.05 mol per 100 grams of the rubber composition.

16. The rubber composition according to claim 7, further comprising one or more vulcanizing assisting agent when organic peroxide is used as a vulcanizing assisting agent.

17. The rubber composition according to claim 16, wherein said vulcanizing assisting agent is one or more vulcanizing assisting agents selected from the group consisting of sulfur, a quinone dioxime compound, a methacrylate compound, an allyl compound, a maleimide compound and divinylbenzene.

18. The rubber composition according to claim 17, wherein said vulcanizing assisting agent is in an amount ranging from 0.5 to 2 mol per one mol of organic peroxide.

19. The rubber composition according to claim 7, further comprising one or more softeners selected from the group consisting of, process oil, lubricating oil, paraffin, liquid paraffin, petroleum asphalt, petroleum jelly, coal tar pitch, castor oil, linseed oil, rubber-substitute, bees wax, recinoleic acid, palmitic acid, barium stearate, calcium stearate, zinc laurate, atactic polypropylene, and coumarone-indene resin.

20. The rubber composition according to claim 7, further comprising one or more fillers selected from the group consisting of carbon black, silicic acid powder, glass powder, glass beads, mica, calcium carbonate, potassium titanate whisker, talc, clay, barium sulfate, glass flake, and fluororesin.

21. The rubber composition according to claim 7, further comprising one or more foaming agents selected from the group consisting of sodium bicarbonate, sodium carbonate, ammonium bicarbonate, ammonium carbonate, ammonium nitrite, N,N'-dimethyl-N,N'-dinitrosoterephthal amide, N,N'-dinitrosopentamethylenetetramine, azodicarbonamide, azobisiso-butylonitrile, azocyclohexylnitrile, azodiaminobenzene, barium azodicarboxylate, benzenesulfonylhydrazide, toluenesulfonylhydrazide, P,P'-oxybis(benzenesulfonylhydrazide), diphenylsulfone-3,3'-disulfonylhydrazide, calcium azido, and 4,4'-diphenyldisulfonylazido-p-toluenesulfonylazido.

22. The rubber composition according to claim 21, wherein said foaming agent is in an amount ranging from 0.5 to 30 parts by weight of the rubber composition.

* * * * *